(12) United States Patent
Badenoch

(10) Patent No.: US 6,564,129 B2
(45) Date of Patent: May 13, 2003

(54) MOTOR VEHICLE DYNAMIC CONTROL

(75) Inventor: Scott Wilson Badenoch, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/919,314

(22) Filed: Jul. 31, 2001

(65) Prior Publication Data

US 2002/0013645 A1 Jan. 31, 2002

Related U.S. Application Data

(60) Provisional application No. 60/221,779, filed on Jul. 31, 2000.

(51) Int. Cl.$^7$ .............................. G06F 7/00; B60G 23/00
(52) U.S. Cl. ..................... 701/37; 701/38; 280/5.502; 280/5.515
(58) Field of Search .............................. 701/36, 37, 38, 701/70, 72, 74, 80, 89, 39; 280/5.507, 5.508, 5.5, 5.515, 5.502, 5.506, 5.512; 180/197, 248, 249; 303/146

(56) References Cited

U.S. PATENT DOCUMENTS

| | | | | |
|---|---|---|---|---|
| 4,712,807 A | * | 12/1987 | Kurosawa | 280/5.507 |
| 5,168,955 A | * | 12/1992 | Naito | 180/197 |
| 5,228,719 A | * | 7/1993 | Fukuyama et al. | 280/5.505 |
| 5,540,299 A | * | 7/1996 | Tohda et al. | 180/242 |
| 5,809,444 A | * | 9/1998 | Hadeler et al. | 303/146 |
| 6,366,841 B1 | * | 4/2002 | Ohsaku | 280/5.5 |

* cited by examiner

Primary Examiner—Jacques H. Louis-Jacques
(74) Attorney, Agent, or Firm—Robert M. Sigler

(57) ABSTRACT

A motor vehicle has a body supported on a front pair of wheels and a rear pair of wheels with front suspension apparatus providing controllable vertical wheel constraint and roll stiffness and a rear pair of wheels with rear suspension apparatus providing controllable vertical wheel constraint and rear roll stiffness. Responsive to a commanded vehicle acceleration or braking, the driven wheel (acceleration) or front (braking) suspension apparatus is briefly altered to provide optimal tire patch traction for the one of the pair of wheels. The alteration may be further responsive to vehicle speed and/or lateral acceleration. The controllable part of the suspension apparatus may be dampers, springs or anti-sway apparatus such as torsion bars. If anti-sway apparatus, the front and/or rear roll stiffness may be controlled to promote oversteer at low vehicle speed and understeer at high vehicle speed.

4 Claims, 3 Drawing Sheets

MOTOR VEHICLE DYNAMIC CONTROL

RELATED APPLICATIONS

This application references and incorporates by reference U.S. Provisional Application No. 60/221,779, filed Jul. 31, 2000.

TECHNICAL FIELD

The technical field of this invention is the dynamic control of motor vehicles.

BACKGROUND OF THE INVENTION

Motor vehicles are designed for a variety of dynamic behaviors, depending on the intended users. Some are designed with an emphasis on comfort and smoothness of ride. Others are designed for tight control and handling characteristics for performance driving. Typically, these dynamic behaviors are considered somewhat mutually exclusive in many ways; and a typical vehicle is designed to be a compromise between comfort and performance. But the development of real time vehicle dynamic controls has provided apparatus capable of changing dynamic characteristics of vehicles in response to sensed operator control inputs or vehicle parameters and thus behaving differently in different dynamic situations.

SUMMARY OF THE INVENTION

This invention contributes to a vehicle that exhibits dynamic characteristics that permit a generally comfortable ride but automatically modulate to a firmer handling characteristic as required to handle certain vehicle dynamic events. It uses suspension apparatus at the front and/or the rear of a motor vehicle that is capable of controlling vertical wheel and body motions and roll stiffness, such as controllable dampers, controllable springs, and/or controllable anti-sway apparatus such as torsion bars and is automatically responsive to sensed vehicle dynamic events to provide altered vehicle dynamic characteristics.

In one aspect of the invention, a motor vehicle has a body supported on a front pair of wheels and a rear pair of wheels, a vehicle acceleration producing device coupled to at least one of the pairs of wheels, a control for the acceleration producing device and a vertical wheel motion constraining apparatus associated with the one of the front pair of wheels and the rear pair of wheels. Responsive to the control, a commanded forward vehicle acceleration is sensed and, during the forward vehicle acceleration, the vertical wheel motion constraining apparatus is loosened so as to provide optimal traction for the one of the pair of wheels.

In another aspect of the invention, a motor vehicle has a body supported on a front pair of wheels with front suspension apparatus providing controllable vertical wheel constraint and roll stiffness and a rear pair of wheels with rear suspension apparatus providing controllable vertical wheel constraint and rear roll stiffness. The vehicle further has a vehicle acceleration producing device coupled to at least one of the pairs of wheels and a control for the acceleration producing device. Responsive to the control, a commanded forward vehicle acceleration is sensed and, during the forward vehicle acceleration, at least one of the front suspension apparatus and the rear suspension apparatus is controlled to produce a lessening of vertical wheel constraint in the one of the pairs of wheels coupled to the vehicle acceleration producing device, relative to the other of the pairs of wheels. The one of the front suspension apparatus and the rear suspension apparatus may be a variable roll bar coupling the driven wheels that it is varied in direction to permit greater independence in vertical motion between the driven wheels, or a controllable damper associated with each of the driven wheels that is varied to permit easier vertical motion of the driven wheels, or an adjustable spring associated with each of the driven wheels that is varied to permit easier vertical motion of the driven wheels.

In another aspect of the invention, a motor vehicle has a body supported on a front pair of wheels and a rear pair of wheels, a propulsion motor coupled to at least one of the pairs of wheels and a control for driving the vehicle at a variable speed. Responsive to a sensed speed of the vehicle, at least one of the front suspension apparatus and the rear suspension apparatus is controlled to increase roll stiffness in the front suspension apparatus relative to roll stiffness in the rear suspension apparatus, and thus vehicle understeer, with increasing vehicle speed. The one of the front suspension apparatus and the rear suspension apparatus may be a variable roll bar coupling the front wheels and varied to permit decreasing independence in vertical motion between the front wheels with increasing vehicle speed, a variable roll bar coupling the rear wheels and varied to permit increasing independence in vertical motion between the rear wheels with increasing vehicle speed, or both.

DESCRIPTION OF THE PREFERRED EMBODIMENTS

Figure 1:
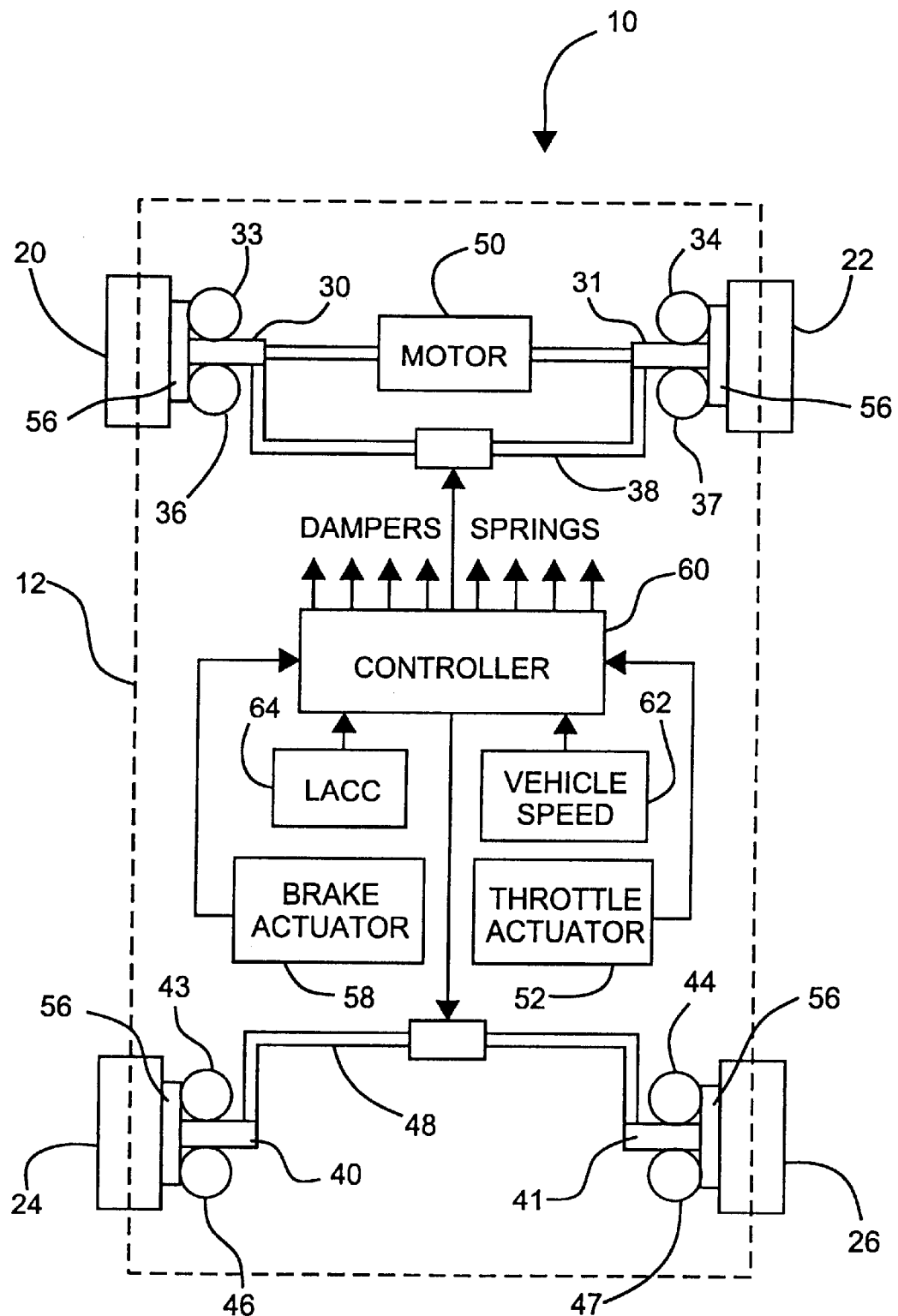
FIG. 1 is a schematic diagram of a vehicle having equipment for a number of embodiments of the invention.

Referring to FIG. 1, a vehicle 10 is shown with a body 12 suspended on a plurality of wheels: preferably a left front wheel 20, a right front wheel 22, a left rear wheel 24 and a right rear wheel 26. The front wheels 20 and 22 together comprise a front pair of wheels that are essentially coaxial on opposite sides of the vehicle; and the rear wheels 24 and 26 together comprise a rear pair of wheels that are essentially coaxial on opposite sides of the vehicle. Each of the wheels 20–26 is equipped with a tire in the normal manner, which is understood to be part of the wheel as disclosed. The front end of the vehicle is suspended on the front pair of wheels on a front suspension apparatus that comprises, for each wheel, wheel support apparatus 30, 31 including a spindle that supports the wheel for rotation, a suspension spring 33, 34 for suspending the body on the wheel support apparatus and thus on the wheel, and a damper 36, 37 for damping vertical movement between the body and the wheel. The front suspension apparatus is further shown with an anti-sway apparatus such as torsion bar 38 connecting the front wheels 20, 22 so as to allow vertical wheel movement of the left and right front wheels in phase but to provide a spring force against left and right front wheel movement out of phase. In this invention, at least one of (a) the suspension springs 33, 34, (b) the dampers 36, 37 and (c) the anti-sway apparatus 38 is controllably variable in its restraining effect on vertical wheel motion.

Similarly, The rear end of the vehicle is suspended on the rear pair of wheels on a rear suspension apparatus that comprises, for each wheel, wheel support apparatus 40, 41 including a spindle that supports the wheel for rotation, a suspension spring 43, 44 for suspending the body on the wheel support apparatus and thus on the wheel, and a damper 46, 47 for damping vertical movement between the body and the wheel. The rear suspension apparatus is further shown with an anti-sway apparatus such as torsion bar 48 connecting the rear wheels 24, 26 so as to allow vertical wheel movement of the left and right rear wheels in phase but to provide a spring force against left and right rear vertical wheel movement out of phase. And like the front suspension apparatus, the rear suspension apparatus of the invention provides at least one of (a) the suspension springs 43, 44, (b) the dampers 46, 47 and (c) the anti-sway apparatus 48 as controllably variable in its restraining effect on vertical motion. Each of the front suspension apparatus and the rear suspension apparatus, in providing a controllably variable effect on the restraint of vertical wheel motion, provides a controllable roll stiffness and the ability to shift the roll moment along the longitudinal axis of the vehicle and thus vary the understeer/oversteer characteristics of the vehicle. This can be accomplished to some extent with either the front suspension apparatus or the rear suspension apparatus by itself; and it can be varied to a greater extent using both simultaneously.

It should be understood, with respect to FIG. 1, that the Figure is intended to show the possibilities of many embodiments of the invention. For practice of the invention in some of its aspects, it is only necessary that one controllable apparatus is provided for one pair of wheels (front or rear): that is, one pair of dampers, one pair of springs or one anti-sway apparatus. In other aspects of the invention, more than one such controllable apparatus may be provided. Although full sets of four springs and four dampers, as well as both front and rear anti-sway apparatus, are shown, they do not all have to be controllable, or even present; and those that are present and controllable will depend on the specific embodiment. If variable, suspension springs 33, 34, 43, 44 may be any springs that are adjustable in spring constant at a sufficiently fast rate, such as air springs, which are adjustable in spring constant by the addition or release of air. If they are not variable, suspension springs 33, 24, 43, 44 may be any useful springs, such as standard coil springs. If variable, dampers 36, 37, 46, 47 may be any damper, shock or strut that is adjustable in damping characteristic at a sufficiently fast rate, preferably in real time. If they are not variable, they may be any known suspension damper, shock or strut. If variable, anti-sway apparatus 38, 48 may be any anti-sway apparatus in which the spring constant of the force opposing out of phase vertical wheel movements is adjustable at a sufficiently fast rate; such apparatus is known in the art. If they are not variable, any anti sway apparatus may be used, including standard torsion bars. The basic characteristic required for any of these devices, if it is variable for use in accordance with this invention, is an ability to controllably adjust the restraint of vertical wheel movement in response to a control signal, relative to the vehicle body, generally within the body vibration frequency of 1 Hz. Of course, such devices that are not controllably variable will usually be found on a vehicle equipped with a controllably adjustable device in accordance with this invention: for example, standard springs and struts on a vehicle with adjustably controllable anti-sway apparatus, or standard springs and a standard torsion bar with adjustably controllable dampers.

Vehicle 10 is further equipped with a motor or engine 50 driving at least one of the front and rear pair of wheels—in this embodiment, the front pair of wheels 20, 22. The motor or engine may be a combustion engine, electric propulsion motor, or any other suitable propulsion device. Motor 50 is responsive to a signal from a throttle actuator 52 that may be operator controlled and/or automatically operated by a motor controller, not separately shown, to provide variable motor output to accelerate the vehicle in the forward or rearward direction. The vehicle is further equipped with brake apparatus including a brake unit 56 at each of the wheels and a brake actuator 58, which may be operator controlled and/or automatically controlled in response to a brake controller, not separately shown. A vehicle speed signal generator 62 is responsive to a suitable sensor to derive vehicle longitudinal speed, although the signal may preferably be generated in the brake controller from wheel speed signals generated in brake actuators 56, as most modern vehicles incorporate wheel speed sensors in their brake systems for use in antilock braking and traction controls. A lateral acceleration sensor 64 may also be provided in some embodiments.

A controller 60 is provided to control the variable front and rear suspension apparatus. It preferably comprises digital computer apparatus having a processor, ROM, RAM and I/O apparatus for receiving input signals and delivering output signals. It preferably stores and runs a control program while the vehicle is in use. The received signals for this invention comprise a brake signal from brake actuator 58 or elsewhere in the braking system, such as from a brake pressure sensor, a throttle signal from throttle actuator 52 or elsewhere in the motor control system, the vehicle speed signal from generator 62 or elsewhere, such as the brake control system as previously described, and the lateral acceleration signal from sensor 64. In addition, other input signals may be provided as required for adapting the invention to other embodiments. Controller 60 outputs command signals to the variable ones of springs 33, 34, 43, 44, dampers 36, 37, 46, 47 and anti-sway apparatus 38, 48 to control these devices as required.

Figure 2:
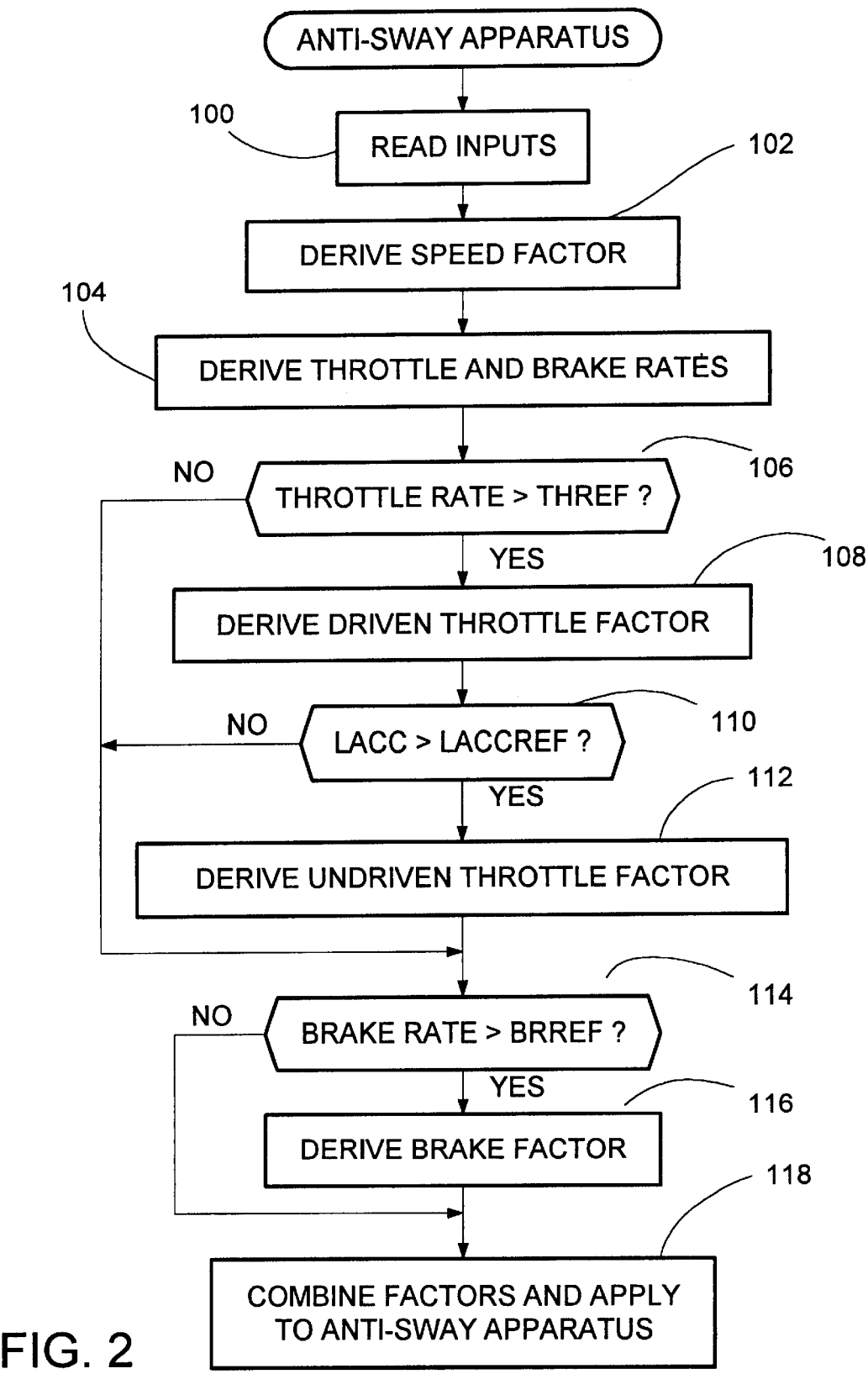
FIGS. 2 and 3 are flow charts providing a description of several embodiments of the invention.

A program ANTI-SWAY APPARATUS is stored and run in controller 60 is shown in flow chart form in FIG. 2 for an embodiment in which the apparatus controlled in accordance with this invention is a variable anti-sway apparatus in one or both of the front and rear suspension apparatus, preferably in both. The program starts at step 100 by checking the latest values of the inputs, such as vehicle speed, throttle actuator position, brake actuator position, and lateral acceleration. The vehicle speed signal may be derived in another controller from individual wheel speeds or it may be available from the motor controller. The throttle actuator position signal may be derived from the throttle itself or from some member controlling or indicating throttle position. Likewise, the brake actuator position may be derived from the brake pedal, from master cylinder pressure, or from some other member controlling or indicating brake actuation. With respect to the throttle and brake signals, anticipatory signals from actuators are preferred, so that the controllably adjustable apparatus may be prepared for the dynamic situation.

At step 102, the program derives a vehicle speed factor or factors, typically from lookup tables as a function of vehicle speed. The vehicle speed factor for the front pair of wheels varies directly with vehicle speed. Thus, when applied to an anti-sway apparatus such as a torsion bar, it will produce a comparatively smaller roll stiffness at the front of the vehicle at low vehicle speeds and increase the front roll stiffness as vehicle speed increases. For a rear anti-sway apparatus, the variation is just the opposite: inverse to vehicle speed, so that the rear roll stiffness decreases with increasing vehicle speed. This produces an easier steering characteristic (more oversteer/less understeer) for low speed steering maneuvers (parking, etc.) and a tighter steering characteristic (less oversteer/more understeer) at higher vehicle speeds for vehicle directional stability.

At step 104, the program derives the throttle and brake rates. The throttle rate is the time rate of change of throttle actuator position and may be derived by differentiating the throttle actuator position signal from sensor 52 in a common digital algorithm. The brake rate is the time rate of change of brake pressure, which may similarly be derived by differentiating the brake actuator position signal obtained from sensor 58. This step may be skipped for either the throttle or brake if a rate of change signal is available directly or if the inventive apparatus is responsive only to the other.

At step 106, the magnitude of the rate of change of the throttle signal is compared with a reference THREF. If the magnitude exceeds the reference, the program proceeds to step 108, wherein a scaled throttle factor is derived for the driven wheel anti-sway apparatus, typically from a lookup table using the magnitude and direction of throttle change as inputs. For a positive direction of throttle actuator position (forward vehicle acceleration), the stored throttle factor values produce greater softening for increasing magnitude of the rate of change of throttle actuator position. This is intended, when applied to the driven wheels, to enhance the ability of the tires of the driven wheels to maintain a predetermined optimum tire contact patch with the road surface for maximum handling stability. For a negative acceleration, the opposite variation is provided, so that the change at the driven wheels will be in the tightening direction, although response to negative throttle changes is optional. It should be noted that the driven wheels in this embodiment are the front wheels, but on many vehicles they would be the rear wheels.

From step 108, the program proceeds to step 110, in which the lateral acceleration is compared with a stored reference LACCREF. If the lateral acceleration exceeds this reference, a throttle factor for the undriven wheel anti-sway apparatus is derived, typically from another lookup table, at step 112. The values in this table vary in the opposite direction from the variation for the driven wheel anti-sway apparatus, for both positive and negative accelerations, so as to compensate, when applied to the non-driven wheel anti-sway apparatus, any change in roll moment produced in the driven wheel anti-sway apparatus. There is no particular need for this compensation unless there is a lateral acceleration that would produce a body roll. It should be noted that, with the anti-sway apparatus at front and rear being varied in opposite directions, there will be change in the steering characteristic of the vehicle; but this change tends to compensate an opposite change produced by the throttle change giving rise to the adjustment. It should also be noted that the changes produced by the throttle factor will be of short duration, being present essentially only during the period of the acceleration.

From step 112, or from either of steps 106 and 110, if the magnitude of throttle of does not exceed the reference, the program proceeds directly to step 114. If the path was directly from step 106, there will be only a default, neutral throttle factor for both the front and rear anti-sway apparatus. If the path was directly from step 110, the undriven wheel throttle factor will be the default (neutral) factor.

At step 114, the value of the brake rate, derived in step 104, is compared with a reference BRREF and, if it is greater, the program proceeds to step 116. If it is not greater, the program skips step 116 and the brake factor assumes a default (neutral) value. At step 116, a brake factor is derived, typically from a lookup table on the basis of the brake rate. The variation of the table values will be to decrease roll stiffness at the front of the vehicle but increase roll stiffness at the rear of the vehicle with increasing brake rate (deceleration).

The program then proceeds to step 118, in which the speed, throttle and brake factors are combined and applied to the front and rear anti-sway apparatus as appropriate. Preferably, the factors are stored in numerical form such that they can be simply summed, with the default or neutral values providing no change from the default or normal vehicle handling characteristics. It should be noted with care that the speed and brake factors are applied on the basis of front and rear wheels, while the throttle factors are combined on the basis of driven and undriven wheels. For a front drive vehicle, the driven wheels are the front wheels; but for a rear drive vehicle, the driven wheels are the rear wheels. Thus the specific combination equations will be different for front and rear drive vehicles.

Figure 3:
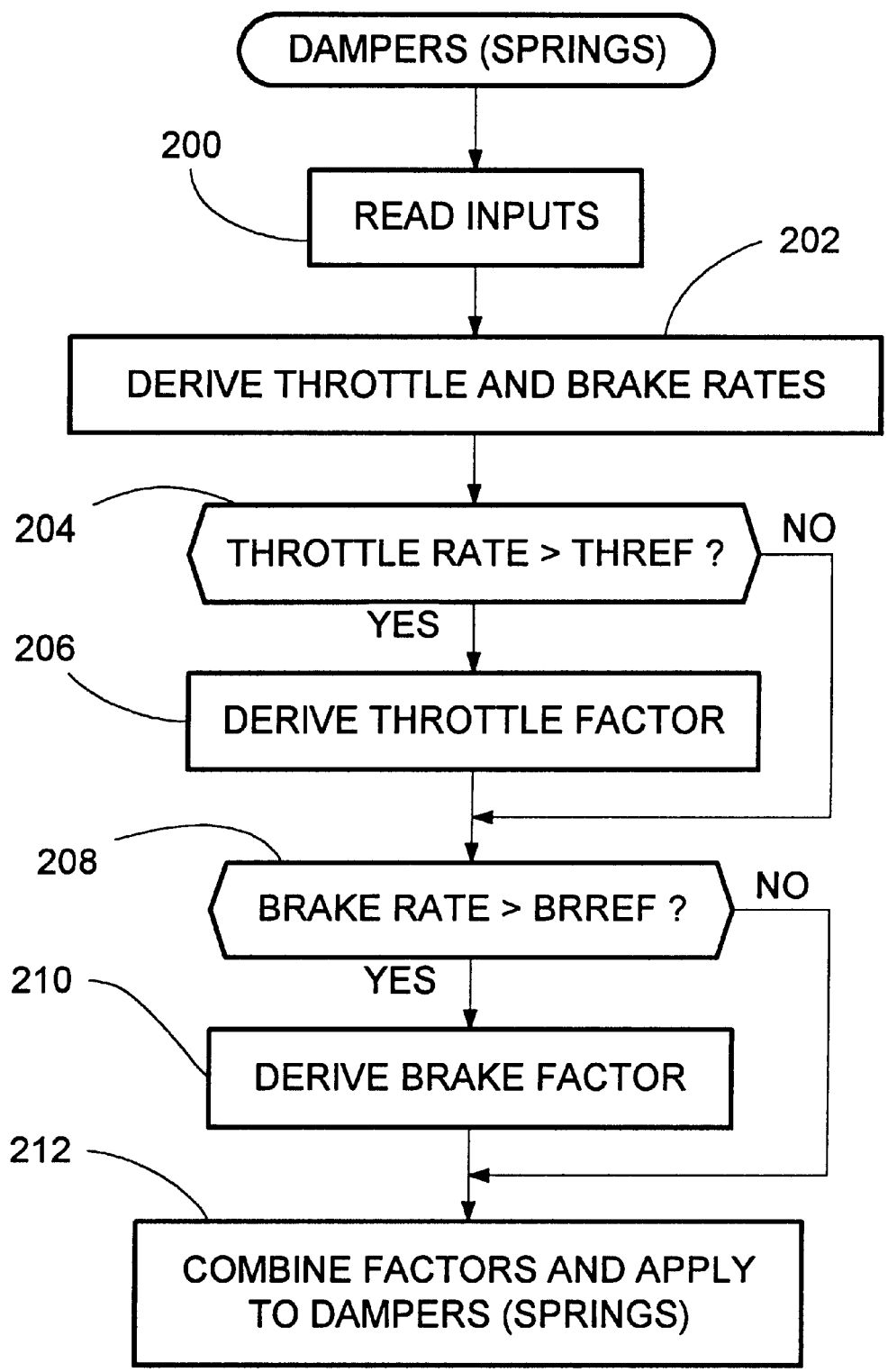

FIG. 3 shows a flow chart of a program DAMPERS (SPRINGS) for a vehicle having dampers controlled according to the invention. Typically, this would apply to all four dampers 36, 37, 46, 47, but either the front pair 36, 37 or the rear pair 46, 47 could be used alone. The embodiment may alternatively be read as having springs controlled according to the invention, with a substitution of springs 33, 34, 43, 44 for the associated dampers 36, 37, 46, 47 as required.

The program starts at step 200 by checking the latest sensor values, such as vehicle speed, throttle actuator position, brake actuator position and lateral acceleration. These signals may be derived as previously described with respect to the embodiment of FIG. 2. At step 202, the program derives the throttle and brake rates, also as previously described.

At step 204, the magnitude of the rate of change of the throttle signal is compared with a reference THREF. If the magnitude exceeds the reference, the program proceeds to step 206, wherein a scaled throttle factor is derived for the driven wheel dampers, typically from a lookup table using the magnitude and direction of throttle change as inputs. For a positive direction of throttle actuator position (forward vehicle acceleration), the stored throttle factor values produce greater softening for increasing magnitude of the rate of change of throttle actuator position. This is intended, when applied to the driven wheels, which are the front wheels in a front drive vehicle as in this embodiment and are the rear wheels in a rear drive vehicle, to enhance the ability of the tires of the driven wheels to maintain a predetermined optimum tire contact patch with the road surface for maximum handling stability. For a negative acceleration, the opposite variation is provided, so that the change at the driven wheels will be in the stiffening direction, although response to negative throttle changes is optional.

From step 206, or from step 204 if the magnitude of the throttle rate does not exceed the reference, the program proceeds to step 208, wherein the brake rate is compared with a reference BRREF. If it is greater, the program proceeds to step 210 in which a brake factor is derived. If it is not greater, step 210 is skipped, and the brake factor is given a default (neutral) value. At step 210, the brake factor is derived, typically from a lookup table. Its magnitude varies with the brake rate and may also vary with vehicle speed and/or lateral acceleration. The factor for the front wheel dampers produces a softening of the dampers that varies directly with brake rate but inversely with vehicle speed. This softening, which is initiated from the sensed indication of brake application, occurs sufficiently early to assist braking by assisting the early forward weight transfer of the vehicle to the front wheels and thus helps ensure the optimal tire patch for traction of the front tires during braking. But at higher vehicle speeds, the softening is decreased, to emphasize pitch stability (that is, to reduce forward pitch of the vehicle body). The effect produced, for braking from a high speed, is to delay forward vehicle pitch until a lower speed is attained. A firming of the rear wheel dampers may be provided varying directly with both brake rate and vehicle speed, at least in rebound.

From step 210, or directly from step 208 if the brake rate does not exceed the reference, the program proceeds to step 212, wherein the throttle and brake factors are combined and applied to the front and rear dampers as appropriate. The manner of application to the dampers may preferably be similar to that, for example, shown in U.S. Pat. No. 6,219, 602, issued Apr. 17, 2001, or U.S. Pat. No. 6,181,997, issued Jan. 30, 2001 or U.S. Pat. No. 6,097,999, issued Aug. 1, 2000, the relevant portions of which are incorporated by reference. Each of these patents describes a semi-active, real time damper control using continuously variable dampers in the commands to each damper are based on the sum of a normal component based on a demand force computed for each damper but set to zero whenever the direction of damper movement is inconsistent with generating such a force by damping and an overriding component applied without regard to such consideration. Such a system permits application of the overriding command as desired, for example, only in rebound. Of course, other controlled damping schemes are known in the art and may be used.

It should be noted that air or other spring controls are also known in the art and may be used for controlling springs as a substitute for dampers in the embodiment of FIG. 3, to the extent that the control response is sufficiently fast.

What is claimed is:

1. A method of controlling a motor vehicle having a body supported on a front pair of wheels with front suspension apparatus providing vertical wheel constraint and roll stiffness and a rear pair of wheels with rear suspension apparatus providing vertical wheel constraint and rear roll stiffness, a vehicle acceleration producing device coupled to at least one of the front pair of wheels and the rear pair of wheels, and a control for the acceleration producing device, the method comprising the steps:

responsive to the control, sensing a commanded forward vehicle acceleration, and during the forward vehicle acceleration, controlling at least one of the front suspension apparatus and the rear suspension apparatus to produce a lessening of vertical wheel constraint in the one of the front pair of wheels and the rear pair of wheels coupled to the vehicle acceleration producing device, relative to the other of the front pair of wheels and the rear pair of wheels, wherein the one of the front suspension apparatus and the rear suspension apparatus is a variable anti-sway apparatus coupling the driven wheels and it is varied in direction to permit greater independence in vertical motion between the driven wheels.

2. A method of controlling a motor vehicle having a body supported on a front pair of wheels and a rear pair of wheels, a propulsion motor coupled to at least one of the front pair of wheels and the rear pair of wheels, and a control for driving the vehicle at a variable speed, the method comprising the steps:

sensing the speed of the vehicle, and responsive to the sensed speed of the vehicle, controlling at least one of the front suspension apparatus and the rear suspension apparatus to increase roll stiffness in the front suspension apparatus relative to roll stiffness in the rear suspension apparatus, and thus vehicle understeer, with increasing vehicle speed, wherein the one of the front suspension apparatus and the rear suspension apparatus is a variable anti-sway apparatus coupling the front wheels and it is varied in direction to permit decreasing independence in vertical motion between the front wheels with increasing vehicle speed.

3. A method of controlling a motor vehicle having a body supported on a front pair of wheels and a rear pair of wheels, a propulsion motor coupled to at least one of the front pair of wheels and the rear pair of wheels, and a control for driving the vehicle at a variable speed, the method comprising the steps:

sensing the speed of the vehicle, and responsive to the sensed speed of the vehicle, controlling at least one of the front suspension apparatus and the rear suspension apparatus to increase roll stiffness in the front suspension apparatus relative to roll stiffness in the rear suspension apparatus, and thus vehicle understeer, with increasing vehicle speed, wherein the one of the front suspension apparatus and the rear suspension apparatus is a variable anti-sway apparatus coupling the rear wheels and it is varied in direction to permit increasing independence in vertical motion between the rear wheels with increasing vehicle speed.

4. A method of controlling a motor vehicle having a body supported on a front pair of wheels and a rear pair of wheel, a propulsion motor coupled to at least one of the front pair of wheels and the rear pair of wheels, and a control for driving the vehicle at a variable speed, the method comprising the steps:

sensing the speed of the vehicle, and suspension apparatus and the rear suspension apparatus to increase roll the front suspension apparatus relative to roll stiffness in the rear suspension apparatus, and thus vehicle understeer, with increasing vehicle speed, wherein the least one of the front suspension apparatus and the rear suspension apparatus comprises a variable anti-sway apparatus coupling the front wheels and varied in direction to permit decreasing independence in vertical motion between the front wheels with increasing vehicle speed and a variable anti-sway apparatus coupling the rear wheels and varied in direction to permit increasing independence in vertical motion between the rear wheels with increasing vehicle speed.

* * * * *